(12) United States Patent
Raukola et al.

(10) Patent No.: US 7,587,994 B2
(45) Date of Patent: Sep. 15, 2009

(54) ARRANGEMENT IN RECOVERY BOILER

(75) Inventors: Antti Raukola, Kangasala (FI); Kari Haaga, Tampere (FI); Aki Hakulinen, Tampere (FI)

(73) Assignee: Kvaerner Power Oy, Tampere (FI)

( * ) Notice: Subject to any disclaimer, the term of this patent is extended or adjusted under 35 U.S.C. 154(b) by 292 days.

(21) Appl. No.: 11/439,383

(22) Filed: May 23, 2006

(65) Prior Publication Data

US 2006/0288963 A1 Dec. 28, 2006

(30) Foreign Application Priority Data

Jun. 2, 2005 (FI) .................................. 2055279

(51) Int. Cl.
*F22B 1/18* (2006.01)
(52) U.S. Cl. ...................... 122/7 R; 122/470
(58) Field of Classification Search ................. 122/7 R, 122/470
See application file for complete search history.

(56) References Cited

U.S. PATENT DOCUMENTS

| 3,169,512 | A | * | 2/1965 | Hochmuth | 122/7 R |
| 5,299,534 | A | * | 4/1994 | Janka | 122/477 |
| 5,769,156 | A | * | 6/1998 | Storbacka | 165/145 |
| 5,787,844 | A | * | 8/1998 | Paju | 122/7 C |
| 6,609,482 | B2 | * | 8/2003 | Ruohola et al. | 122/7 R |

| 2002/0043192 | A1 | 4/2002 | Philippe et al. |
| 2002/0189553 | A1 | 12/2002 | Ruohola et al. |
| 2002/0194849 | A1 | 12/2002 | Saviharju et al. |

FOREIGN PATENT DOCUMENTS

| FI | 103903 | 9/1996 |
| FI | 98384 | 7/1997 |
| JP | 04045301 | 2/1992 |
| JP | 05203103 | 8/1993 |
| WO | 98/43017 | 10/1998 |
| WO | 00/29666 | 5/2000 |
| WO | 03/104547 | 12/2003 |

OTHER PUBLICATIONS

Patent Abstracts of Japan of JP 04045301 dated Feb. 14, 1992.
Patent Abstracts of Japan of JP 05203103 dated Aug. 10, 1993.

* cited by examiner

*Primary Examiner*—Gregory A Wilson
(74) *Attorney, Agent, or Firm*—Ladas and Parry LLP

(57) ABSTRACT

The invention relates to an arrangement in a recovery boiler into which spent liquor to be incinerated and combustion air are supplied, the arrangement comprising superheaters (4a-4d) in the upper part of the recovery boiler for recovering heat, at least one boiler bank (11) located in a flue gas duct part (10a) known as the second pass, immediately after the recovery boiler, and at least one economizer (12a-12b) in a duct part after the second pass in the recovery boiler flue gas duct (10).

The invention comprises an economizer (21) located parallel with the boiler bank (11) in the second pass.

8 Claims, 3 Drawing Sheets

FIG: 1

Prior art

ARRANGEMENT IN RECOVERY BOILER

BACKGROUND OF THE INVENTION

The invention relates to an arrangement in a recovery boiler into which spent liquor to be incinerated and combustion air are supplied, the arrangement comprising superheaters in the upper part of the recovery boiler, a boiler bank located in a flue gas duct part known as the second pass immediately after the recovery boiler, the boiler bank being formed of a plural number of parallel elements transverse in relation to the flue gas duct in a size substantially equal to the width of the flue gas duct, and at least one economizer for recovering heat in a duct part after the second pass in the recovery boiler flue gas duct.

Black liquor created in pulp production is incinerated in a recovery boiler at a pulp mill in order to recover from the liquor both heat energy and chemicals that can be recycled in the pulp mill process. Combustion in the furnace generates heat, which is recovered by means of walls and other heat recovery surfaces. These heat recovery surfaces are interconnected in different ways so that different heat recovery surfaces, such as boiler banks and economizers, in the recovery boiler and in the gas duct located after the boiler can be used for heating cold water and converting it into steam, the superheaters then enabling the saturated steam to be heated so that superheated high-pressure steam is produced for the pulp mill and for generating electricity.

Superheaters are usually located in the upper part of the recovery boiler, above what is known as a nose, in a space through which flue gases flow from the recovery boiler to the flue gas duct. The flue gas duct is formed of a plural number of successive at least partly vertical duct parts in which the flue gases flow alternately from top to bottom and from bottom to top. To enhance the efficiency of the boiler, these ducts are usually provided with a boiler bank in the first part, i.e. the second pass, the flowing flue gas heating the boiler bank and thereby bringing water contained therein to boil, the mixture of water and steam then moving into a drum belonging to the water circulation of the recovery boiler. Some of the other flue gas duct parts are typically provided with economizers for using the cooled flue gases to heat cold water supplied to replace the steam that has left the water system of the recovery boiler.

Although the number of economizers may vary according to application, an essential aspect is that a water temperature as high as possible is obtained at the operating temperature of the recovery boiler before the water is conveyed into the drum.

SUMMARY OF THE INVENTION

It is an object of the invention to provide a recovery boiler with an arrangement that allows the temperature of feed water in the economizers to be increased from the present level, which then enables the heat recovery surfaces in the recovery boiler to be optimised better than before for high-pressure recovery boilers. The arrangement of the invention is characterized in that in addition to the boiler bank, the flue gas duct part, i.e. the second pass, of the flue gas duct located immediately after the recovery boiler is provided with an economizer, the boiler bank and the economizer being placed one after the other in the incoming direction of the flue gas.

An essential idea of the invention is that in addition to the boiler bank the second pass is provided with an economizer which is preferably the last one of successive economizers connected in series, whereby the flue gas flowing through the second pass heats both the boiler bank and the economizer.

According to an embodiment of the invention the boiler bank is closer to the recovery boiler in the second pass, whereas the economizer is further away from the boiler.

An advantage of the invention is that it allows a suitable temperature surface area to be provided for the boiler bank, thus making it possible to increase the temperature of the feed water closer to the boiling temperature of water while having, at the same time, a sufficiently low boiler bank temperature for controlling partial loads. A further advantage of the invention is that since the temperature of the feed water entering the drum is closer to the saturated temperature, the surface level in the drum is easier to regulate. A yet further advantage is that due to heat transfer by the economizers it is possible to make the temperature surface, i.e. the boiler bank, after the superheater area smaller to aim at the same final flue gas temperature. A still further advantage is that fewer upper circulation pipes are needed for the second pass than currently.

SUMMARY OF THE FIGURES

Some embodiments of the invention will be described in greater detail with reference to the accompanying drawings, in which.

DETAILED DESCRIPTION OF SOME EMBODIMENTS OF THE INVENTION

Figure 1:
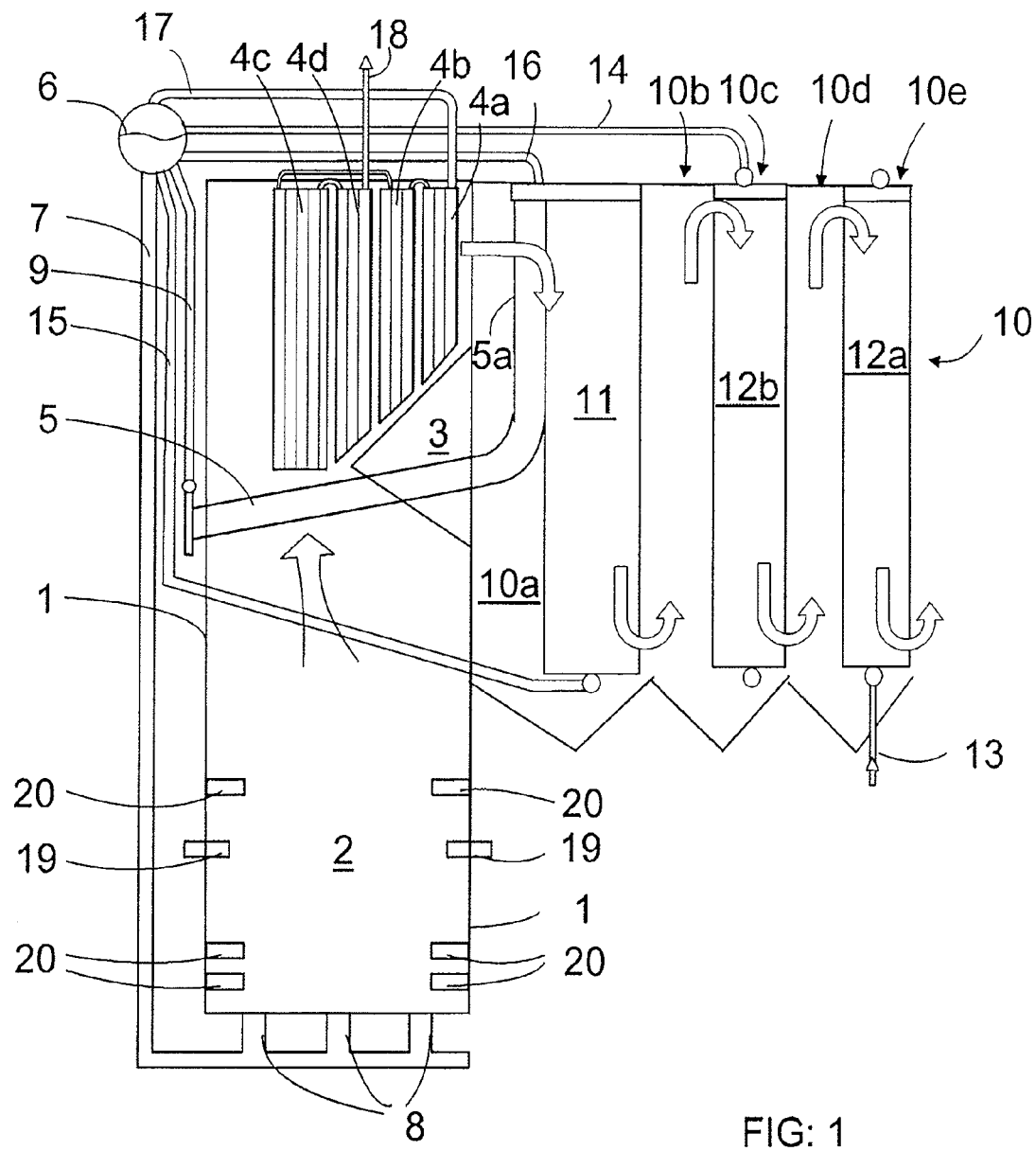
FIG. 1 is a schematic, vertical and sectional side view of a prior art recovery boiler.
Figure 2:
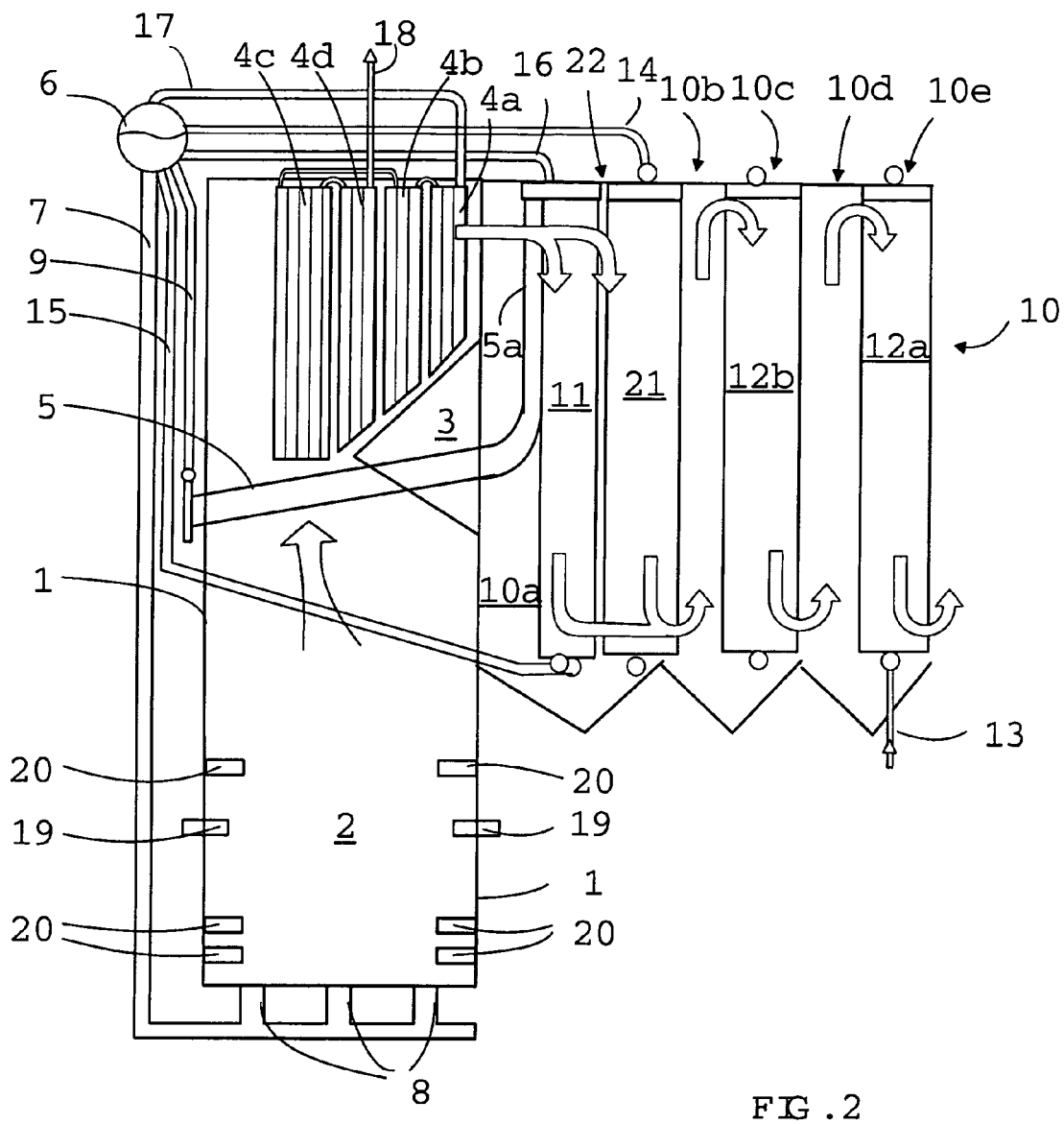
FIG. 2 is a schematic, vertical and sectional side view of a recovery boiler provided with an embodiment of the arrangement of the invention.

FIG. 1 is a schematic, vertical and sectional side view of a prior art recovery boiler. FIG. 2, in turn, is a schematic, vertical and sectional side view of a recovery boiler provided with an embodiment of the arrangement of the invention. In both figures like reference numerals are used for like components and they are not described separately unless necessary for the understanding of the solution in question.

The recovery boiler is provided with walls 1 formed by welding pipes in a manner known per se. The walls enclose a furnace 2 provided with a nose 3 in the upper part thereof for guiding flue gas flows in a suitable manner. Above the nose 3 in the upper part of the recovery boiler there are superheaters 4a-4d formed of pipes. The superheaters 4a-4d are elements consisting of a plural number of parallel vertical pipes, the recovery boiler being provided with a plural number of such elements in the transverse direction thereof. The superheaters 4a-4d have steam flowing therein, the steam being heated by means of hot flue gases that heat the pipes from the outside. In current solutions screen pipes 5 are typically arranged below the superheaters 4a-4d, at the nose 3. The screen pipes 5 consist of relatively scattered pipes in which saturated water circulates, the flue gases flowing past the screen pipes causing some of the water to evaporate. Consequently, the temperature of the flue gases decreases before they reach the superheaters. The screen pipes also protect the superheaters 4a-4d against direct radiation from the furnace. These recovery boiler walls 1, superheaters 4a-4d and screen pipes 5 provide what are known as heat recovery surfaces. These heat recovery surfaces contain either separate pipes or welded pipes forming solid walls, such as the walls of the recovery boiler 1.

The heat recovery surfaces have water or steam flowing therein, the water being heated as a result of combustion taking place outside the surfaces or by the impact of hot gases.

The water and steam system of the recovery boiler is provided with what is known as a drum 6 containing both water and steam. In some cases it is possible that a plural number of drums 6 is provided. From the drum 6 the water and the steam are conveyed in their respective pipeworks into the pipes that form the recovery boiler walls and to the different heat recovery surfaces to heat water on one hand and to superheat steam on the other. The drum 6 is provided with discharge pipes 7 leading to lower circulation pipes 8 in the lower part of the recovery boiler. Further, the drum 6 is provided with pipes 9 leading to the screen pipes 5. The screen pipes 5 have risers 5a as extensions located in the flue gas duct 10 and conveying water/steam heated or possibly partly evaporated in the screen pipes upward and further through a pipe 16 into the drum 6.

Further, the recovery boiler is provided with a flue gas duct 10 located after the superheater area and consisting of successive duct parts 10a-10e whose ends are connected to each other. The flue gas duct typically contains heat recovery surfaces formed of elements consisting of parallel pipes typically suspended from their upper ends and forming what is known as a boiler bank 11 or economizers 12a-12b. The boiler bank 11 is located in a first duct part 10a after the recovery boiler, known as the second pass, where according to a typical embodiment the flue gases flow downward. The boiler bank 11 and the economizers 12a and 12b are formed of a plural number of parallel elements transverse in relation to the flue gas duct and typically equal in size to the width of the flue gas duct. The elements in turn consist of pipes arranged one after the other in the direction of width of an element and either welded together in a laminar format or separate from each other, water/steam flowing in the pipes.

Flue gas coming out of the upper part of the recovery boiler flows along the boiler bank 11 in the second pass from top to bottom, from the lower end of the second pass further to a next duct part 10b, through which it flows upward to a duct part 10c, i.e. to a third pass, and to an economizer 12b provided therein, and then down. Through a duct part 10d the flue gas again rises to a next duct part 10e and to an economizer 12a provided therein, the flue gas flowing downward through the economizer. The economizers are used to pre-heat the water supplied into the recovery boiler with already fairly cooled flue gases, which improves the overall heat recovery capacity of the recovery boiler. Water needed to replace the water that evaporates from the recovery boiler is typically fed through a pipe 13 to the lower end of the first economizer 12a of economizers connected in series, i.e. the one which comes last in the flue gas flow, the water thus flowing upward in the economizer against the flue gas flow. From the upper end of the economizer 12a the somewhat heated water flows to the lower end of the economizer 12b and again upward inside the economizer 12b. From the upper end of the economizer 12b the heated water is conveyed to the drum 6 through a pipework 14. The structure and use of this kind of boiler banks 11 and economizers 12a-12b, their placement in the flue gas duct 10 and in parts 10a-10 thereof and the associated piping are generally fully known per se and obvious to a skilled person, which is why it is not necessary to describe them in greater detail in this context. From the drum 6 the warm water is conveyed further through a pipework 15 to the lower end of the boiler bank 11. From the upper end of the boiler bank 11 the mixture of saturated steam/water flows into the drum 6 through a pipework 16. From the drum 6 the steam then flows to the first superheater 4a through a pipe 17 and after having flowed through the superheaters 4a-4d, it is discharged through a pipe 18 to be used for some suitable purpose.

The walls 1 of the recovery boiler are provided with nozzles 19 for supplying spent liquor, typically black liquor, created in the pulp mill process into the recovery boiler for combustion. The walls of the recovery boiler are also provided with air nozzles 20 for supplying the air needed for combustion. The air may be supplied from different points of the recovery boiler in various ways known per se. All the different pipe connections, circulation of water and steam in the pipework and the heat recovery surfaces as well as the supply of spent liquor and air are solutions generally known per se and obvious to a skilled person, which is why it is not necessary to describe them in greater detail in this context.

FIG. 2 is a schematic, vertical and sectional side view of a recovery boiler provided with an embodiment of the arrangement of the invention. Compared with the solution of FIG. 1, the boiler bank 11 of this embodiment is smaller in size and thereby also in surface area. In accordance with the invention, there is also provided an economizer 21 in the same duct part 10a, i.e. in the second pass, so that the two are one after the other in the incoming direction of the flue gas, the boiler bank 11 being closer to the recovery boiler. In order to bring the temperature of the feed water as high as possible, the economizer 21 is connected in series with the other economizers 12a and 12b so that it is last in the series. The upper end of the second economizer 12b is connected to the lower end of the economizer 21 in the second pass, the pipework 14 leading to the drum 6 being correspondingly connected to the upper end of the economizer 21 in the second pass. The water heated in the second economizer 12b thus flows to the lower end of the economizer 21 and through it, whereby it is further heated, before it flows through the pipework 14 into the drum 6. Between the boiler bank 11 and the economizer 21 there may be a soot passage 22 for cleaning them. Compared with prior art solutions, this solution facilitates the adjusting of the recovery boiler in connection with partial loads.

Figure 3:
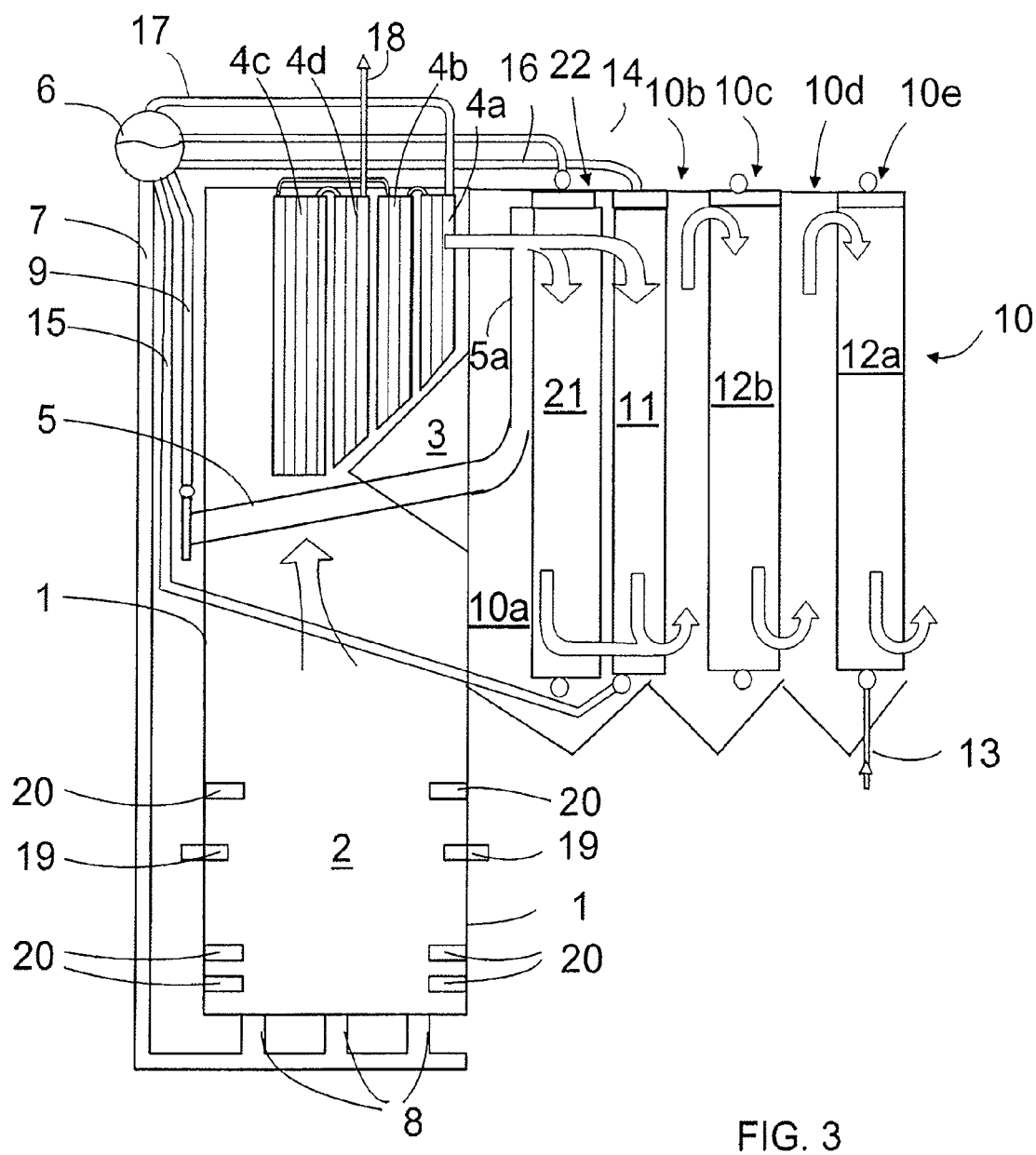
FIG. 3 is a schematic, vertical and sectional side view of a recovery boiler provided with another embodiment of the invention.

FIG. 3 is a schematic, vertical and sectional side view of a recovery boiler provided with another embodiment of the invention, in which like reference numerals are used for like components. In particular, FIG. 3 shows an arrangement wherein the boiler bank 11 and the economizer 21 in the second pass are mounted in such a way that the economizer 21 is closer to the recovery boiler in the duct 10a and the boiler bank 11 is further away from the recovery boiler in the duct 10a.

The invention is described in the above specification and the drawings by way of example only, without restricting it thereto in any way. It is also possible to reverse the order of the boiler bank and the economizer in the second pass so that the economizer is closer to the recovery boiler and the boiler bank further away from it. An essential aspect is that the first flue gas duct part after the recovery boiler, the one known as the second pass, is provided not only with the usual boiler bank substantially equal in size to the width of the flue gas duct but also with an economizer for heating feed the water.

The invention claimed is:

1. An arrangement in a recovery boiler into which spent liquor to be incinerated and combustion air are supplied, the arrangement including:
   superheaters in the upper part of the recovery boiler,
   a boiler bank located in a flue gas duct part known as the second pass immediately after the recovery boiler, the boiler bank being formed of a plural number of parallel elements transverse in relation to the flue gas duct in a size substantially equal to the width of the flue gas duct, and at least one economizer for recovering heat in a duct part after the second pass in the recovery boiler flue gas duct, wherein there is provided an economizer, in addition to the boiler bank, in the flue gas duct part, known as the second pass, of the flue gas duct located immediately after the recovery boiler, the boiler bank and the economizer being placed one after the other in the incoming direction of the flue gas.

2. An arrangement according to claim 1, wherein the boiler bank and the economizer in the second pass are mounted in such a way that the boiler bank is closer to the recovery boiler in the duct and the economizer is further away from the recovery boiler in the duct.

3. An arrangement according to claim 2, wherein the economizer in the second pass is connected in series with the other economizers so that feed water flows through the other economizer into the economizer in the second pass and through there further into a drum of the recovery boiler.

4. An arrangement according to claim 1, wherein the boiler bank and the economizer in the second pass are mounted in such a way that the economizer is closer to the recovery boiler in the duct and the boiler bank is further away from the recovery boiler in the duct.

5. An arrangement according to claim 4, wherein the economizer in the second pass is connected in series with the other economizers so that feed water flows through the other economizer into the economizer in the second pass and through there further into a drum of the recovery boiler.

6. An arrangement according to claim 1, wherein the economizer in the second pass is connected in series with the other economizers so that feed water flows through the other economizer into the economizer in the second pass and through there further into a drum of the recovery boiler.

7. An arrangement according to claim 1, wherein the second pass of the flue gas duct is vertical so that the flue gases flow downward in vertical direction along the boiler bank and the economizer and that water is arranged to flow from bottom to top in the economizer.

8. An arrangement according to claim 1, wherein there is a soot passage between the economizer and the boiler bank.

* * * * *

UNITED STATES PATENT AND TRADEMARK OFFICE
CERTIFICATE OF CORRECTION

| | |
|---|---|
| PATENT NO. | : 7,587,994 B2 |
| APPLICATION NO. | : 11/439383 |
| DATED | : September 15, 2009 |
| INVENTOR(S) | : Antti Raukola et al. |

Page 1 of 1

It is certified that error appears in the above-identified patent and that said Letters Patent is hereby corrected as shown below:

TITLE PAGE,

Item (30), Foreign Application Priority Data: "2055279" should read --20055279--.

Signed and Sealed this

Fifteenth Day of December, 2009

David J. Kappos
*Director of the United States Patent and Trademark Office*